UNITED STATES PATENT OFFICE.

CARL BOSCH AND ALWIN MITTASCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

CATALYTIC PRODUCTION OF AMMONIA.

1,083,585.  Specification of Letters Patent.  Patented Jan. 6, 1914.

No Drawing.  Application filed October 15, 1912.  Serial No. 725,814.

*To all whom it may concern:*

Be it known that we, CARL BOSCH and ALWIN MITTASCH, subjects, respectively, of the King of Prussia and the King of Saxony, residing at Ludwigshafen-on-the-Rhine, Germany, have invented new and useful Improvements in the Catalytic Production of Ammonia, of which the following is a specification.

The specification of the application for patent Serial No. 661,013 describes the production of ammonia from its elements while using, as a contact agent, chemically pure iron which has been produced from the oxid, or other compound, at a comparatively low temperature, preferably a temperature not exceeding 600° C. We have now found that good yields of ammonia can be obtained by passing a mixture of hydrogen and nitrogen over pure iron, or pure iron nitrid, which has been prepared from iron compounds, such for instance as iron oxid, by treatment with ammonia at a temperature above 600° C., provided that the production of such iron or iron nitrid takes place in the presence of an excess of ammonia, that is to say, that more ammonia is present than corresponds to the state of equilibrium for the temperature employed. In order to effect this, the ammonia must be passed rapidly through the reaction apparatus and the speed should be increased with the temperature employed. The use of a higher temperature for the reduction is advantageous, because the reduction of iron compounds takes place but slowly at temperatures below 600° C., whereas at higher temperatures the reaction takes place more quickly.

During the process of this invention the iron produced may remain as such or, more probably, combines with a small proportion of nitrogen, and further, during the production of ammonia, the quantity of nitrogen combined with the iron may vary, so that for the purposes of this invention we regard iron and iron nitrid as equivalent.

The following example will serve to illustrate further the nature of our invention, which, however, is not confined to this example. Heat pure iron oxid, at 800° C., in a quickly moving current of ammonia gas, and employ the iron thus produced, which contains some nitrogen, for the catalytic production of ammonia, for instance at a temperature between 500° and 600° C., while employing pressure.

Now what we claim is:—

1. The process for the catalytic production of ammonia from its elements employing pure iron as a catalytic agent which is characterized by employing as the contact mass such pure iron as has been prepared from its compounds by treatment with ammonia at a temperature above 600° C.

2. The process for the catalytic production of ammonia from its elements employing pure iron as a catalytic agent which is characterized by employing as the contact mass such pure iron as has been prepared from its compounds by treatment with ammonia at a temperature above 600° C., provided that the production of such iron takes place in the presence of an excess of ammonia.

In testimony whereof we have hereunto set our hands in the presence of two subscribing witnesses.

CARL BOSCH.
ALWIN MITTASCH.

Witnesses:
J. ALEC LLOYD,
JOSEPH PFEIFFER.